`US010765946B2`

(12) United States Patent
Kinney et al.

(10) Patent No.: US 10,765,946 B2
(45) Date of Patent: Sep. 8, 2020

(54) VIDEO GAME DYNAMIC GAME PLAY SUPPORT OPTIONS

(71) Applicants: Peter Kinney, Santa Monica, CA (US); Christopher Anjos, Santa Monica, CA (US)

(72) Inventors: Peter Kinney, Santa Monica, CA (US); Christopher Anjos, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/226,222

(22) Filed: Dec. 19, 2018

(65) Prior Publication Data
US 2020/0139246 A1 May 7, 2020

Related U.S. Application Data

(60) Provisional application No. 62/755,211, filed on Nov. 2, 2018.

(51) Int. Cl.
*A63F 9/00* (2006.01)
*A63F 13/537* (2014.01)
*A63F 13/69* (2014.01)
*A63F 13/58* (2014.01)

(52) U.S. Cl.
CPC ............ *A63F 13/537* (2014.09); *A63F 13/58* (2014.09); *A63F 13/69* (2014.09)

(58) Field of Classification Search
None
See application file for complete search history.

(56) References Cited

U.S. PATENT DOCUMENTS

| | | | | |
|---|---|---|---|---|
| 6,254,099 | B1 * | 7/2001 | Pederson | A63F 3/00075 273/262 |
| 6,322,077 | B1 * | 11/2001 | Braunlich | A63F 1/02 273/292 |
| 6,412,779 | B1 * | 7/2002 | Kenney | A63F 1/04 273/274 |
| 6,623,010 | B1 * | 9/2003 | Holland, Jr. | A63F 1/02 273/292 |
| 7,111,844 | B2 * | 9/2006 | Andrie | A63F 3/00697 273/255 |
| 7,374,171 | B1 * | 5/2008 | Mencarelli | A63F 1/04 273/243 |
| 8,448,947 | B2 * | 5/2013 | McAndrew | A63F 1/02 273/288 |
| 2009/0054124 | A1 * | 2/2009 | Robbers | A63F 1/00 463/9 |

(Continued)

OTHER PUBLICATIONS

Marchiafava, Jeff. "Labyrinth: Card Games and Tactical RPGs Collide in Labyrinth". Oct. 27, 2015. < https://www.gameinformer.com/games/labyrinth/b/pc/archive/2015/10/27/card-games-and-tactical-rpgs-collide-in-labyrinth.aspx (Year: 2015).*

(Continued)

*Primary Examiner* — Seng H Lim
(74) *Attorney, Agent, or Firm* — Klein, O'Neill & Singh, LLP

(57) ABSTRACT

Goods available to be obtained for use by a game character in a video game are displayed in stacks of icons indicative of the goods. The icons may be stacked such that goods of greater immediate use to the game character are higher in the stacks.

13 Claims, 5 Drawing Sheets

(56) References Cited

U.S. PATENT DOCUMENTS

| | | | | |
|---|---|---|---|---|
| 2010/0304806 A1* | 12/2010 | Coleman | ............... | A63F 13/822 |
| | | | | 463/2 |
| 2012/0001390 A1* | 1/2012 | McAndrew | ............... | A63F 1/02 |
| | | | | 273/288 |
| 2013/0337906 A1* | 12/2013 | Ikeda | ...................... | A63F 13/69 |
| | | | | 463/29 |
| 2014/0200083 A1* | 7/2014 | Tabata | ................... | A63F 13/12 |
| | | | | 463/42 |
| 2014/0279284 A1* | 9/2014 | Haseyama | ......... | G06Q 30/0641 |
| | | | | 705/27.1 |
| 2014/0302923 A1* | 10/2014 | Sato | ..................... | A63F 13/847 |
| | | | | 463/31 |
| 2014/0327210 A1* | 11/2014 | Gerard | ..................... | A63F 1/00 |
| | | | | 273/308 |

OTHER PUBLICATIONS

Labyrinth (Free Online TCG/RPG): Watcha Playin'? Gameplay First Look. Mar. 10, 2016. <https://www.youtube.com/watch?v=e4GoaAtnYbY>. Accessed Dec. 18, 2019. (Year: 2016).*

Suszek, Mike. "Sony launches Blackjack-meets-RPG Suits and Swords on iOS, Android". Jan. 12, 2014. <https://www.engadget.com/2014/01/23/sony-launches-blackjack-meets-rpg-suits-and-swords-on-ios-andro/> Accessed Dec. 18, 2019 (Year: 2014).*

\* cited by examiner

VIDEO GAME DYNAMIC GAME PLAY SUPPORT OPTIONS

CROSS REFERENCE TO RELATED APPLICATION

This application claims the benefit of the filing date of U.S. Provisional Patent Application No. 62/755,211, filed on Nov. 2, 2018, the disclosure of which is incorporated by reference herein.

BACKGROUND OF THE INVENTION

The present invention relates generally to video games, and more particularly to presentation of options for supplies and equipment for a video game character.

Video games provide a source of entertainment for many. Video games often provide an interactive activity that can be interesting and challenging, and may allow game players to control game characters engaged in various simulated activities, including real-life activities that may otherwise be unavailable to the game player. Moreover, the game characters may utilize personal equipment not readily available in the real world to game players, allowing the game players simulated use of a variety of real world items.

Often times the equipment and supplies available for use by a game character may be varied and extensive. The opportunity to select equipment and supplies from a large number of possibilities may allow a game player to finely calibrate play of the video game to the game player's liking. Moreover, the success of the video game character in the video game may depend not only on game play skill of the game player, but also on how that video game character is equipped.

Unfortunately, the selection of equipment and supplies may itself detract from enjoyment of play of the video game, particularly when a game player is faced with a seemingly endless set of possibilities. In such circumstances, a game player may not wish to expend significant amounts of time perusing a catalog of available equipment and supplies, and the numerosity of options may itself make selection of particular desired equipment difficult. A lack of the proper equipment or tools, whether purposeful or through inadvertence, may make progress in a video game difficult, and perhaps decrease game player enjoyment of the video game.

In addition, during game play some equipment and supplies may perhaps be more suitable for use during some game conditions, and less suitable for use at other times. A game player may want to obtain or could make better use of different equipment or supplies at various time during game play. During game play, or between game play sessions, a game player may decide to change equipment, for strategic or tactical game play reasons, or merely based on a whim. Whether the game player obtains the different equipment or supplies during game play or during an intermission of game play, taking extensive time to peruse the available possibilities and select the best of the available numerous options may detract from time spent enjoying play of the game.

BRIEF SUMMARY OF THE INVENTION

Some embodiments in accordance with aspects of the invention provide a method for presenting goods to a game player for use by a game character in a video game, comprising: determining available goods; determining an ordering for the available goods; determining a primary set of the available goods based on the ordering; determining at least one secondary set of the available goods based on the ordering; and formatting information of the primary set and the secondary set to provide a display with a primary set of stacked icons representative of goods of the primary set of the available goods and with at least one secondary set of stacked icons representative of goods of the secondary set of the available goods, with icons of the primary set of stacked icons having a visually distinct appearance from icons of the at least one secondary set of stacked icons.

Some such embodiments further provide for displaying the primary set of stacked icons and the at least one secondary set of stacked icons on a display device. In some such embodiments the goods associated with the icons may be made available for use by the game character of the video game through selection of the icons. In some embodiments the ordering for the available goods is based on a current status of the game character in the video game. In some such embodiments the ordering for the available goods is further based on goods held by other game characters. In some such embodiments the ordering for the available goods is further based on past selection of goods for use by the game character.

These and other aspects of the invention are more fully comprehended upon review of this disclosure.

DETAILED DESCRIPTION

Figure 1:
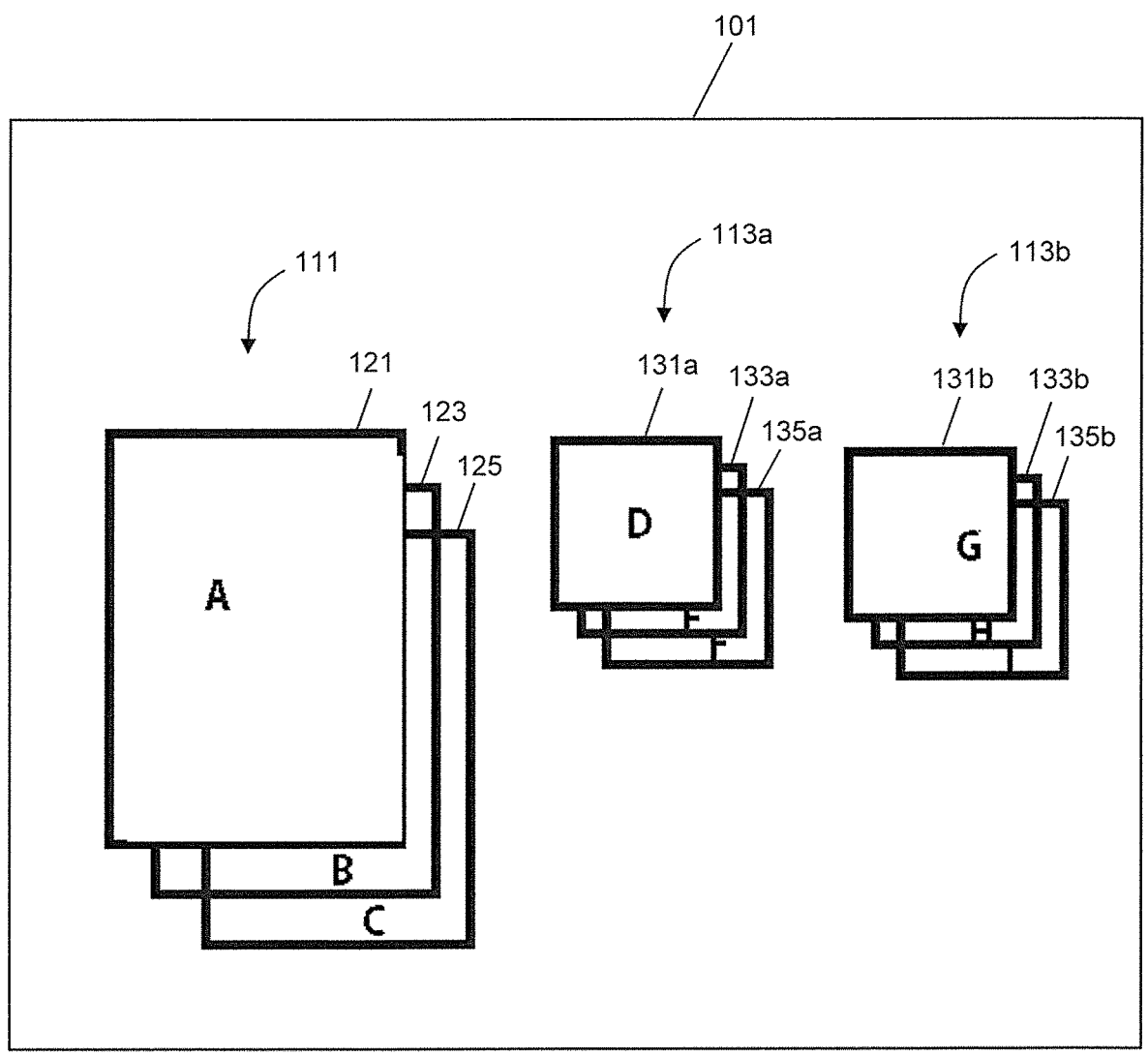
FIG. 1 diagrammatically illustrates a goods display for a video game, in accordance with aspects of the invention.

FIG. 1 diagrammatically illustrates a goods display for a video game, in accordance with aspects of the invention. The goods display generally provides a game player the opportunity to obtain goods for a video game character controlled by the game player. In some embodiments the goods display may only provide the opportunity to obtain a subset of goods that might be available. In various embodiments the goods may be equipment and supplies. In some embodiments the equipment may be items carried by, driven by, or worn by the game character. In some embodiments the supplies may be items consumed or depleted by the game character or actions relating to the game character during video game play. In some embodiments the supplies may non-tangible, for example health points, strength points, or some other indicator or indication relating to status of the game character. For example, in a first person shooter game, the equipment may include various weapons, various add-ons to the weapons, particular body armor or clothing for the game character, or a variety of other items. Also for example, in a first person shooter game the supplies could include particular ammunition for the weapons, additional health or damage points, or a variety of items consumable during video game play.

The goods display is generally displayed on a screen 101 of a display device. The screen may be that of a computer monitor, a television screen, a smartphone, a laptop screen, or some other display device. The display device displays information provided by a compute device, of which the display device may be part. The compute device is generally configured for play of a video game, and in various embodiments the compute device comprises a game console, personal computer, laptop, tablet computer, or smartphone.

The goods display includes a plurality of stacked icons representative of goods that may be obtained by the game player for use by the game character. With each icon representative of a good, or item, the icons may be considered associated with a good, or item, and vice versa. In some embodiments each of the goods may be obtained for use by the game character through selection of the corresponding icons, for example by way of use of a compute device input device, for example a mouse or touchscreen. In some embodiments selection of an icon representative of a particular good results in possession of the good by the game character. In some embodiments only selection of an uppermost icon of a stack of icons provides for obtaining the associated good, with selection of lower icons causing the selected lower icon to rise in the stack to become the uppermost icon of the stack. In some embodiments, however, selection of the uppermost icon results in display of one or more additional displays, which may request additional information required to be provided so that the game character may possess the good. In various embodiments the additional information may information of a code, information of one or more responses to questions, information relating to financial information, or other information.

In some embodiments, and as illustrated in FIG. 1, the stacked icons include a primary set of stacked icons 111 and one or more secondary sets of stacked icons 113*a,b*. The display of the stacked icons of the primary set may have a visually distinct appearance than display of the stacked icons of the secondary sets. In some embodiments the stacked icons of the primary set may be displayed in larger form than the stacked icons of the secondary sets. In some embodiments the stacked icons of the primary set may be displayed in some other manner that is distinctive than display of the stacked icons of the secondary sets.

In some embodiments determination of whether a good should be associated with an icon of the primary set or one of the secondary sets and stacking of the icons is based on an ordering, which may change over time. In some embodiments the ordering is based on one, some, or all of status of the game character in the video game, current equipment and/or supplies of the game character, past selections of equipment and/or supplies for the game character, style of play of the game character, equipment and/or supplies utilized by other game characters of other game players, recommendations of equipment and/or supplies made by other game players, promotions defined by a distributor, creator, or publisher of the game, and/or other factors. In some embodiments stacking of the icons is ordered based on items the game character is deemed most likely to need at a given time, or to achieve a defined goal, for example to reach a next level of game play. In some embodiments the items the game character is deemed most likely to need to reach the next level of game play are items the game character does not have, but were held by other game characters at a time the other game characters reached the next level of game play. In some embodiments the items the game character is deemed most likely to need are consumable items which the game character has at a level below a predefined level. In some embodiments the consumable items are consumable items previously selected for the game character. In some embodiments the ordering excludes equipment held by the game character. In some embodiments items ordered highest are placed in the primary set of stacked icons. In some embodiments the primary set of stacked icons includes a predefined number of icons.

In FIG. 1, the primary set of stacked icons includes a first primary icon 121, a second primary icon 123, and a third primary icon 125. In other embodiments the primary set of stacked icons may include a different number of icons. In some embodiments the primary set of stacked icons may include 5 or no more than 5 icons. In some embodiments the primary set of stacked icons may include 10 icons or between 6 and 10 icons, inclusive. The first primary icon may be associated with an item A, which may be obtained for later use by the game character during play of the video game. The item A may be, for example, an item of equipment useful during play of the video game, for example a weapon in a first person shooter game. Alternatively, the item A may be, for example, a consumable item useful during play of the video game, for example ammunition for a weapon, food, or strength or health points for the game character. Similarly, the second primary icon may be associated with an item B, and the third primary icon may be associated with an item C, both of which may be obtained for later use by the game character during play of the video game. In various embodiments, each of the primary icons may include a representation of the item with which they are associated, and/or text information indicating or describing the item. As may be seen in FIG. 1, the first primary icon is completely visible, the second primary icon is partially hidden (and partially visible) underneath the first primary icon, and the third primary icon is partially hidden (and partially visible) underneath the first primary icon and the second primary icon.

FIG. 1 also includes two secondary sets of icons, a first secondary set of icons 113*a* and a second secondary set of icons 113*b*. In some embodiments only one secondary set of icons is provided, in other embodiments more than two secondary sets of icons are provided. As with the primary set of stacked icons, the secondary sets of icons each include a first secondary icon 131*a,b*, a second secondary icon 133*a,b*, and a third secondary icon 135*a,b*. As with the primary set of stacked icons, in various embodiments the secondary set of stacked icons may include a different number of icons. In the embodiment shown in FIG. 1, each of the secondary sets of icons include a same number of icons as the primary set of icons. In other embodiments the different sets of icons may include differing numbers of icons, or some of the sets may have a same number of icons while other sets may have a different number of icons.

For the first set of secondary icons, the first secondary icon 131*a* may be associated with an item D, the second secondary icon 133*a* may be associated with an item E, and the third secondary icon 135*a* may be associated with an item F, all of which may be obtained for later use by the game character during play of the video game. Similarly, for the second set of secondary icons, the first secondary icon 131*b* may be associated with an item G, the second secondary icon 133*b* may be associated with an item H, and the third secondary icon 135*b* may be associated with an item I, all of which may be obtained for later use by the game character during play of the video game. As with the items A-C, the items D-I may be each an item of equipment or a consumable useable by the game character during game play.

In some embodiments the goods A-I may be all of the goods available for the game character. In some embodiments the goods A-I may be a subset of all of the goods available for the game character. In some embodiments a list or other indication of goods available for the game character may be maintained, and either all of the goods ranked to determine the goods A-I to be associated with icons, or the goods A-I to be associated with icons otherwise determined.

As may be seen in FIG. 1, as with the primary icons, for the first set of secondary icons, the first secondary icon 131a is completely visible, the second secondary icon 133a is partially hidden (and partially visible) underneath the first secondary icon 133a, and the third secondary icon 135a is partially hidden (and partially visible) underneath the first secondary icon 133a and the second secondary icon 133a. The second set of secondary icons are correspondingly arranged.

In some embodiments the stacked icons are generally ordered by expected utility of their associated goods to the game character. In some embodiments the ordering is performed considering the game character's current status in the game. In some embodiments the ordering is re-ordered upon changes in the game character's status in the game, or when the status changes by more than a predetermined amount, and/or periodically. In some embodiments the game character's current status in the game is indicated by one, some, or all of a health level of the game character, a map in which the game character is present, a level of the game character, equipment held by the game character, and/or a level of one or more consumables held by the game character. In some embodiments the ordering is performed, in addition or instead, considering the style of play utilized for the game character. In some embodiments the style of play utilized for the game character is based on equipment held by the game character, extent of movement of the game character during a prior predetermined period of time, extent of damage inflicted by and/or inflicted on the game character during a prior predetermined period of time, or other factors. In some embodiments a matrix is maintained, with entries in the matrix indicating expected utility to a game character for each of a plurality of possible states for status of the game character in the game.

In some embodiments icons for the goods with the highest rankings in the order are placed in the primary set of stacked icons, with the highest ranked of those also higher in the set of stacked icons. With respect to such an embodiment, therefore, using the example of FIG. 1, the good A associated with the icon 121 would be the highest ranked good, followed by the good B associated with the icon 123, followed in turn by the good C associated with the icon 125. Similarly, the goods D, E, F associated with icons 131a,b,c may be, in order, the next highest ranked goods, followed, in order, by the goods G, H, I associated with icons 133a,b,c.

In various embodiments a game player may, through operation of compute device inputs, sort through the stacked icons. In some embodiments use of a particular input may successively moving the highest icon to the lowest position in the stack. For example, for the embodiment of FIG. 1, use of the particular input may change the order of the stacked icons from the A-B-C order shown in FIG. 1, to a B-C-A order. In some embodiments selection of a particular icon other than an uppermost icon in the stack results in the particular icon being placed on the top of the stack of icons.

Figure 2:
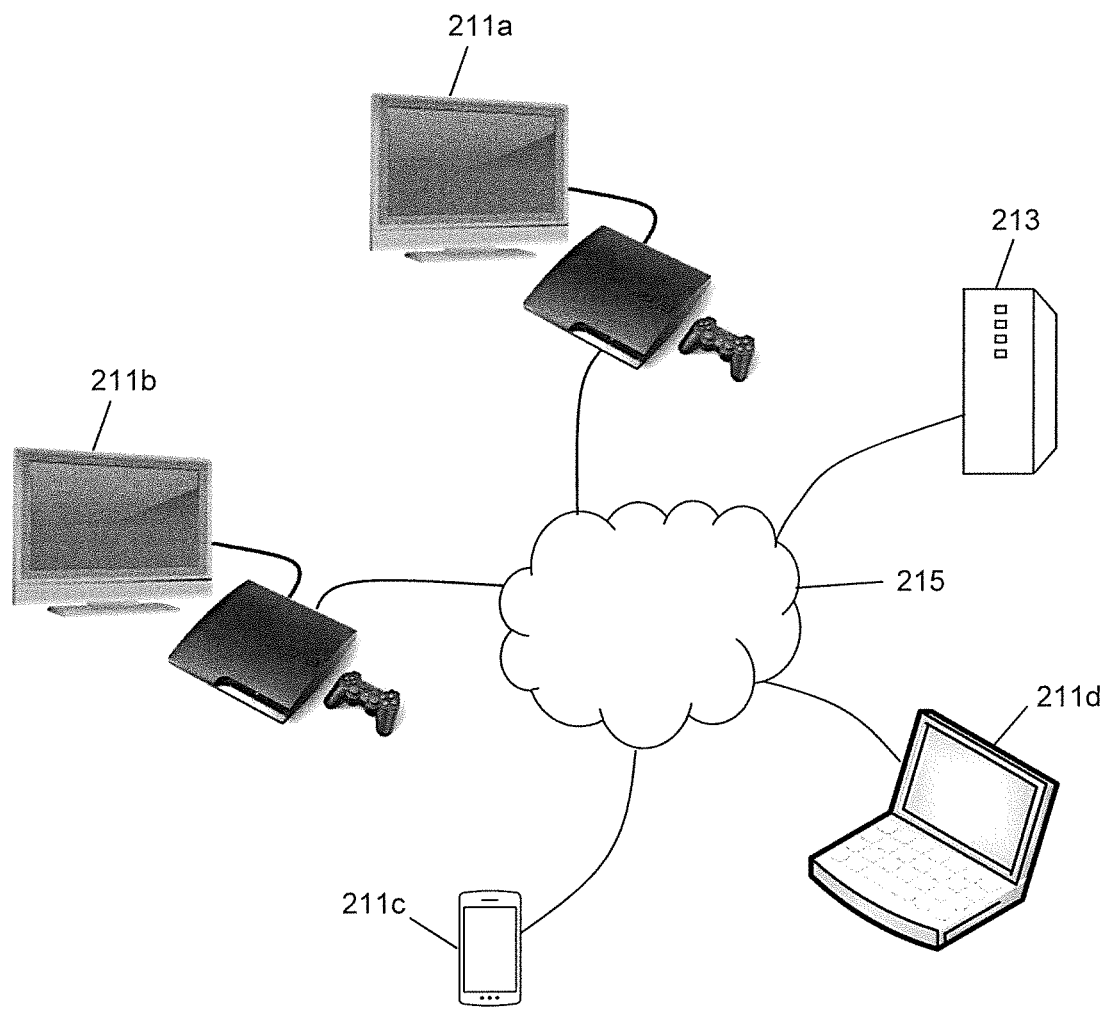
FIG. 2 illustrates a networked video game system in accordance with aspects of the invention.

FIG. 2 is a semi-block diagram of a system in accordance with aspects of the invention. The system includes a plurality of game devices 211a-d coupled to each other and a game server 213 over a network 215, which may be for example the Internet. The game devices, and the server, may be considered compute devices.

The game devices 211a and 211b are shown as including a game console having at least one processor, a game controller, and a display. The game device 211c is shown as a smartphone, including at least one processor, a display device, and a touchscreen. The game device 211d is shown as a personal computer, of the laptop type in FIG. 2. More generally, in various embodiments the game devices may instead or in addition comprise a personal computer, a tablet computer, a smart phone, and/or some other compute device, each configured for video game play. In addition, for purposes of illustration, only a small number of game devices are shown in FIG. 2, in most embodiments the number of game devices may be over a thousand, and may be an order of magnitude or orders of magnitude greater than that.

The game devices are configured, or configurable, for play of a video game, for example a single player and/or multi-player video game. During play of the video game, a game player utilizes the game controller or other input devices of a game device to control actions of a game character associated with the game player. The game character, responsive to commands provided by the game controller, is in and interacts with a virtual world and its other inhabitants, some of whom may be game characters controlled by other game players and some of whom may be game characters controlled by the video game itself. The game devices are also configured to display a goods display, for example the goods display of FIG. 1, on display devices of the game devices. In addition, in some embodiments the goods display may also be displayed on a device not configured for game play, but in communication with the game server. For example, in some embodiments a game player may have a smartphone not configured for game play, with game play instead for example occurring on a game console, but the smartphone may be configured to display the goods display, instead of or in addition to the game console of the game player.

For a single player video game, the game device may receive information from the game server relating to goods which may be obtained for use by the game character, although in some embodiments the game device may maintain such information. In such embodiments the game device may inform the game server of goods obtained for use by the game character, and possibly provide and receive related information.

In multi-player video games, the game server receives information regarding game play status from the game devices, with the game server distributing the game play status to the various game devices. In some embodiments the game server may instead receive requests for game character actions from the game devices, with the game server determining game play status and distributing information regarding game play status to the game devices. The game server may provide information to the game devices relating to goods which may be obtained for use by the game character. In some embodiments different game devices may receive the same information, while in some embodiments the game devices may receive different information. In some embodiments the game server may provide game devices information relating to particular goods that is individualized for the game character being controlled in video game play through use of that game device. For example, the game server may determine an ordering of goods, as discussed with respect to FIG. 1, that is specific for a particular game character, and provide that ordering of goods to the game device with which the particular game character is associated. In other embodiments the game server may determine an ordering of goods common to a plurality of game characters, for example game characters in a particular level and/or map of video game play. In such embodiments the game server may provide such an ordering of goods to a plurality of the game devices, the game devices being those associated with the plurality of game characters. The game server is shown in FIG. 2 as a stand-alone server. In various embodiments, however, functions of the game server may instead be performed by a game device.

Figure 3:
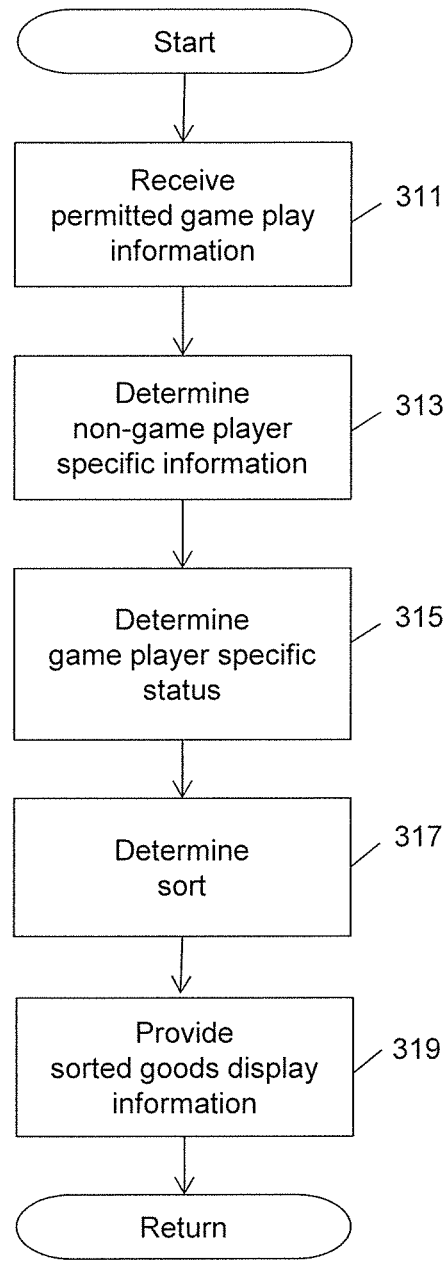
FIG. 3 is a flow diagram of a process for determining goods display information in accordance with aspects of the invention.

FIG. 3 is a flow diagram of a process for determining goods display information in accordance with aspects of the invention. In some embodiments the goods display information is specific to a particular game character, or a group of game characters. In some embodiments the process is performed by the system of FIG. 2. In some embodiments the process, or part of the process, is performed by a server, for example the game server of FIG. 2. In some embodiments the process, or part of the process, is performed by a game device, for example a game device of FIG. 2. In some embodiments the process is performed by one or more processors, for example configured by program instructions.

In block 311 the process receives permitted game play information for play of a video game. In some embodiments permitted game play information is information regarding play of a video game which game players have allowed to be used in determining orders of goods for display. In some embodiments the permitted game play information is received over a network. In some embodiments the permitted game play information is received from game devices. In some embodiments game players may have an option, for example during or before game play, to allow for use of information regarding their play of the video game to be used in determining orders of goods for display. In some embodiments the information regarding play of the video game is equipment and supplies held by a game character of the game player during play of the video game. In some embodiments the information regarding play of the video game is equipment and supplies used by the game character in play of a particular level or in a particular map of game play. In some embodiment the information regarding play of the video game is equipment and supplies held by the game character upon achieving a particular accomplishment in game play, for example an accomplishment of reaching a next level. In some embodiments the permitted game play information may also be recommendations by game players as to equipment and supplies that may be useful, either generally, for specific game play styles, or for particular scenarios in game play.

In block 313 the process, using the permitted game play information, determines information related to game play for game characters, with the information not specific to a particular game character, or group of game characters, for which a sorted display of available goods is to be performed. For example, in some embodiments the sorted display of available goods is specific for a single game character controlled by a single game player, and the information related to game play relates to other game characters controlled by other game players. In some embodiments the process determines equipment and supplies held by game characters who have achieved a particular game level. In some embodiments the process determines equipment and supplies held by game characters who have achieved a predetermined measure of success in the game. In some embodiments the predetermined measure of success is relative to other game characters, for example as indicated by a ranking of game characters.

In block 315 the process determines status of the game character, controlled by the game player, for which the sorted display of available goods is to be performed. In some embodiments the status includes a current level and indication(s) of health of the game character. In some embodiments the status includes current equipment and supplies held by the game character. In some embodiments the status includes past usage of equipment and supplies held by the game character, and/or selected for supply to the game character.

In block 317 the process determines a ranking, or sorting, for available equipment and supplies for the game character for which the sorted display of available goods is to be performed. In some embodiments the process determines available equipment and supplies by referencing a list or other indication of equipment and supplies generally available to be obtained for use in the game. In some embodiments the list or other indication may also indicate whether particular equipment and supplies are then available to be obtained for use in the game. In some embodiments the ranking is determined based on weights applied to one, some, or all of supplies previously obtained for the game character, supplies for which the game player is running low (for example below a predefined amount for a particular supply, equipment and supplies utilized by other game players (or other game players who have achieved a particular level of achievement in the game), recommendations by other game players, and/or other factors. In some embodiments the process determines the ranking based only on information pertinent to a level (and map in some embodiments) corresponding to the level (and map in some embodiments) of the game character for which the sorted display of available goods is to be performed. In some embodiments the ranking ranks in order, from highest to lowest, the goods available to be obtained for use by the game character.

In block 319 the process provides information for display of stacked icons for at least some of the ranked goods. In some embodiments the information for display of stacked icons indicates a stacking order for icons of the stacked icons. In some embodiments the process transmits the information for display of stacked icons from a server to a game device, for display by the game device. In some embodiments the process provides the information for display from a processor of the game device to a display device of the game device. In some embodiments the game device causes display of the stacked icons on the display device.

The process thereafter returns.

Figure 4:
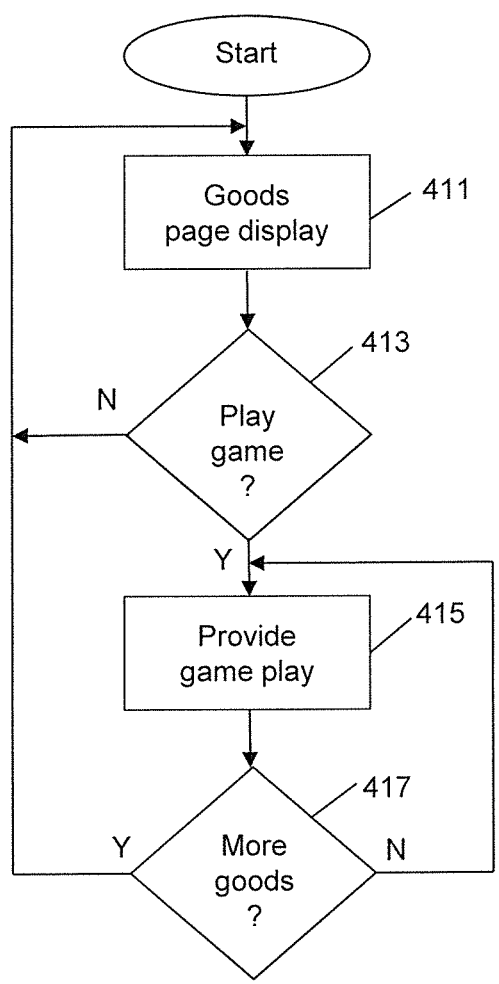
FIG. 4 is a flow diagram of a process for providing for video game play with opportunities to change equipment and supplies, in accordance with aspects of the invention.

FIG. 4 is a flow diagram of a process for providing for video game play of a video game, with opportunities to change equipment and supplies, in accordance with aspects of the invention. In some embodiments the process is performed by the system of FIG. 2. In some embodiments the process, or part of the process, is performed by a server, for example the game server of FIG. 2. In some embodiments the process, or part of the process, is performed by a game device, for example a game device of FIG. 2. In some embodiments the process, or part of the process, is performed by a game device in conjunction with a server, for example the game server of FIG. 2. In some embodiments the process is performed by one or more processors, for example configured by program instructions.

In block 411 the process presents information for obtaining goods on a display of a game device. In some embodiments the information for obtaining goods is provided by the server to the game device. In some embodiments the information for obtaining goods is developed by the game device. In some embodiments the information for obtaining goods is developed by the game device using at least some information from the server. The information for obtaining goods is in the form of stacked icons, each icon of the stacked icons associated with a corresponding good. In some embodiments the stacked icons are presented as discussed with respect to FIG. 1, or elsewhere herein. In some embodiments the process presents the information, in the form of stacked icons, prior to beginning of a game play session. In some embodiments the process in addition or instead presents the information during an intermission of game play, and in some embodiments the process in addition or instead presents the information at a conclusion of a game play session. In addition or instead, in some embodiments the process presents the information upon a request, for example as indicated by receipt of a computer input device input, for display of the information.

In some embodiments the process is responsive to a request to obtain a good, for example as indicated by receipt of a computer input device input. In some embodiments the process provides for provision of a particular good to a game character upon receipt of the computer device input. In some embodiments the process provides for provision of a particular good to a game character upon receipt of the computer device input, and additional computer device inputs (for example inputs which provide for transactional functions). In some embodiments the computer device input is an input indicating selection of a one of the stacked icons corresponding to a one of the goods. In some embodiments the computer device input is an input indicating selection of an uppermost icon in a stack of icons.

In block 413 the process determines if game play should be provided. If not, the process returns to block 411. Otherwise the process continues to block 415. In some embodiments the process determines if game play should be provided based on receipt of a user input indicating a request to begin or continue play of the video game.

In block 415 the process provides for game play of the video game. In some embodiments game play of the video game is accomplished with the user providing user inputs to the game device, for example by way of a game controller or other user input device, to control a game character in and interacting with a virtual world. In some embodiments the video game is a multi-player video game, and the game device provides information to a game server as to status of the game and game character, with the game device also receiving from the game server status of the game and other game characters controlled by other game players. In some embodiments, during game play of the video game, the game character is controlled to utilize goods obtained through interaction with the goods display page. For example, through use of the goods display page, the game character may have obtained particular weapons and/or health points, or other equipment and/or supplies. Such weapons may be utilized during game play to assist the game character in achieving game play results. Similarly, additional health points may allow the game character to survive and continue play of the game, despite damage that may be inflicted on the game character.

In block 417 the process determines if the information for obtaining goods on the display of the game device should be displayed. If not, the process continues providing for game play in block 415. In some embodiment the determination is based on receipt of a user input requesting display of the information. In some embodiments the determination is based on receipt of a user input requesting a cessation, possibly a temporary cessation, of play of the video game. If the information for obtaining goods on the display of the game device should be displayed, the process returns to operations of block 411. In some embodiments, on return to operations of block 411, icons displayed, and stacking of the icons, may be different than prior displays, for example due to re-ordering of expected utility of the goods to the game character. In some embodiments, for example, during game play the game character's status may have changed, or equipment and supplies utilized by other game players may have changed, or equipment and supplies recommended by other game players or the game publisher (or similar entity) may have changed. In one, some, or all of such circumstances, ordering of goods, and the associated ordering of stacked icons, may change.

Figure 5:
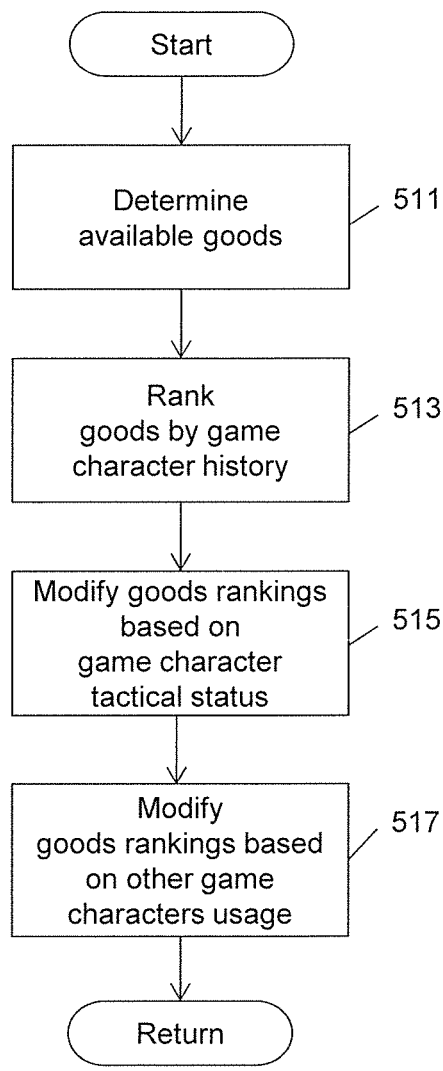
FIG. 5 is a flow diagram of a process for determining an order for display of goods, in accordance with aspects of the invention.

FIG. 5 is a flow diagram of a process for determining an order for display of goods, in accordance with aspects of the invention. In some embodiments the process is performed by the system of FIG. 2. In some embodiments the process, or part of the process, is performed by a server, for example the game server of FIG. 2. In some embodiments the process, or part of the process, is performed by a game device, for example a game device of FIG. 2. In some embodiments the process, or part of the process, is performed by a server in conjunction with a server. In some embodiments the process is performed by one or more processors, for example configured by program instructions. In some embodiments the process implements operations of block 317 of the process of FIG. 3. In some embodiments the order for display of goods is an order for a particular game character controlled by a particular game player.

In block 511 the process determines available goods. In some embodiments the available goods are predetermined, for example by a creator of the video game. In some embodiments the server stores an indication of goods that may be available, for example in a list or a database, and the process determines that all goods that may be available are available. In some embodiments the process may determine that only a subset of all goods that may be available are in fact available, for example based on a time of day and/or for a particular level or map of video game play, or based on other factors.

Operations of blocks 513-517 determine an ordering for the available goods. In some embodiments operations blocks 513-517 are performed in the order indicated. In various embodiments, however, the operations may be performed in other orders or in parallel, or only one or two of the operations of blocks 513-517 may be performed. For example, in some embodiments goods may be ranked by game character tactical status, with the ranking modified based on game character history and/or usage by other game characters.

In block 513 the process ranks, or orders or sorts, the available goods based on history of play and/or goods usage by the particular game character. In some embodiments the available goods are ranked based on expected utility to the particular game character. In some embodiments the available goods are ranked based on past selection of goods for the particular game character. For example, consumable items that relate to previously selected equipment for the particular game character may be ranked higher, as may be consumable items that have a history of being selected for the particular game character. In some embodiments the available goods are in addition or instead ranked based on prior activities of the particular game character. For example, prior activities of the particular game character may indicate that the particular game character has greater movement than an average or median movement of game characters generally, indicating a particular style of play for the particular game character, with goods pertinent to that style of play ranked higher. In some embodiments each of the available goods is provided a weighting factor, for example between 1 and 10 (or some other range), with increasing value of the weighting factor for a good indicating increased rank for the good.

In block 515 the process modifies the ranking of goods based on tactical status of the particular game character. For example, if health of the particular game character is low, the weighting factor, and thus the ranking, for a consumable item of health points may be increased. Similarly, if the particular game character faces a particular situation necessitating use of a particular item of equipment, or the particular item of equipment is particularly suited for the situation, the weighting value, and thus the ranking, for the particular item of equipment may be increased.

In block 517 the process modifies the ranking of goods based on usage of goods by other game characters. For example, if other game characters achieved success while using particular goods, the weighting values for those goods may be increased. Similarly, if game players controlling other game characters recommend particular goods, the weighting values, and thus the rankings, for those goods may be increased.

The process thereafter returns.

Although the invention has been discussed with respect to various embodiments, it should be recognized that the invention comprises the novel and non-obvious claims supported by this disclosure.

What is claimed is:

1. A method for presenting goods to a game player for use by a game character in a video game, comprising:
    receiving, by a server, information regarding the game character in the video game, the game character controlled by a game player during play of the video game on a compute device configured for play of the video game;
    determining, by the server, available goods, the available goods being equipment and/or supplies for use by the game character in the video game;
    determining, by the server, an ordering for the available goods based on the information regarding the game character;
    determining, by the server, a primary set of the available goods based on the ordering;
    determining, by the server, at least one secondary set of the available goods based on the ordering; and
    formatting information of the primary set and the secondary set to provide a display for a compute device with a primary set of stacked icons representative of goods of the primary set of the available goods and with at least one secondary set of stacked icons representative of goods of the secondary set of the available goods, with icons of the primary set of stacked icons having a visually distinct appearance from icons of the at least one secondary set of stacked icons.

2. The method of claim 1, further comprising displaying the primary set of stacked icons and the at least one secondary set of stacked icons on a display for the compute device.

3. The method of claim 2, wherein the goods associated with the icons may be made available for use by the game character of the video game through selection of the icons.

4. The method of claim 1, wherein the ordering for the available goods is further based on a current status of the game character in the video game.

5. The method of claim 4, wherein the ordering for the available goods is further based on goods held by other game characters.

6. The method of claim 4, wherein the ordering for the available goods is further based on past selection of goods for use by the game character.

7. The method of claim 2, further comprising transmitting the formatted information of the primary set and the secondary set from the server to the compute device configured for play of the video game.

8. The method of claim 1, wherein icons of the primary set of stacked icons have the visually distinct appearance from icons of the at least one secondary set of stacked icons by icons of the primary set of stacked icons being larger than icons of the at least one secondary set of stacked icons.

9. The method of claim 1, wherein the at least one secondary set of stacked icons comprises two secondary sets of stacked icons.

10. The method of claim 1, wherein the equipment are items carried by, driven by, or worn by the game character.

11. The method of claim 1, wherein the supplies are items consumed or depleted by the game character or actions relating to the game character during video game play.

12. The method of claim 1, wherein the formatting information to provide a display for the compute device comprises formatting information to provide a display for the compute device configured for play of the video game.

13. The method of claim 1, wherein the formatting information to provide a display for the compute device comprises formatting information to provide a display for a compute device not configured for play of the video game.

* * * * *